US008896611B2

(12) United States Patent
Tang et al.

(10) Patent No.: US 8,896,611 B2
(45) Date of Patent: Nov. 25, 2014

(54) BI-DIRECTIONAL DATA TRANSMISSION SYSTEM AND METHOD

(75) Inventors: Sen-Huang Tang, Lo Tung (TW); Po-Chiang Wu, Chu Pei (TW)

(73) Assignee: Realtek Semiconductor Corp., Hsinchu (TW)

( * ) Notice: Subject to any disclaimer, the term of this patent is extended or adjusted under 35 U.S.C. 154(b) by 1846 days.

(21) Appl. No.: 11/878,758

(22) Filed: Jul. 26, 2007

(65) Prior Publication Data

US 2008/0170081 A1 Jul. 17, 2008

(30) Foreign Application Priority Data

Jul. 27, 2006 (TW) ................................ 95127426 A

(51) Int. Cl.
*G06F 13/14* (2006.01)
*G09G 5/00* (2006.01)

(52) U.S. Cl.
CPC ............ *G09G 5/006* (2013.01); *G09G 2370/12* (2013.01); *G09G 2370/047* (2013.01); *G09G 2320/08* (2013.01)
USPC ........................................... 345/520; 709/203

(58) Field of Classification Search
USPC .................. 345/1.1, 204, 211, 214, 520, 522; 709/203, 204; 715/700
See application file for complete search history.

(56) References Cited

U.S. PATENT DOCUMENTS

| | | | | |
|---|---|---|---|---|
| 5,903,259 | A * | 5/1999 | Brusky et al. | 345/168 |
| 2003/0038896 | A1 | 2/2003 | Kang | |
| 2005/0275603 | A1 * | 12/2005 | Park | 345/1.1 |
| 2007/0222779 | A1 * | 9/2007 | Fastert et al. | 345/418 |

* cited by examiner

*Primary Examiner* — Abbas Abdulselam

(74) *Attorney, Agent, or Firm* — Birch, Stewart, Kolasch & Birch, LLP

(57) ABSTRACT

A bidirectional data transmission system and the transmitting method thereof are disclosed. A video graphics array interface or an interface including a display data channel is utilized in the bidirectional data transmission to transmit data in bi-direction.

31 Claims, 6 Drawing Sheets

BI-DIRECTIONAL DATA TRANSMISSION SYSTEM AND METHOD

BACKGROUND OF THE INVENTION

1. Field of the Invention

The invention relates to a data transmission system and, more particularly, to a bidirectional data transmission system.

2. Description of the Related Art

FIG. 1 schematically shows data transmission of a transmission system 10, wherein a video graphics array (VGA) interface or a digital visual interface (DVI) is used to transmit data between a display and a host system. Generally, a VGA interface or a digital visual interface (DVI) is integrated with display data channel (DDC) to become a signal transmission line. The transmission system 10 receives input signals from keyboard 13, mouse 14, remoter 15, or other input devices via the input/output interface (I/O interface) 121 of a display 12, and processes the input signals, and outputs an output signal to a host system 11 via Universal Serial Bus (USB) lines. Then, the host system 11 executes tasks assigned by the output signal, and transmits image data to the display 12 via VGA interface or DVI transmission line connected with a VGA graphic card (not shown) of the host system 11.

In order to transmit the output signals of the input devices 13, 14, and 15 to the host system 11, an extra USB line should be used for the display 12. However, it will increase not only the cost of the display 12, but also the disorder degree of the line arrangement of the peripherals of the host system 11.

BRIEF SUMMARY OF THE INVENTION

One of the objects of the present invention is to provide a bidirectional data transmission system, a display applied in the data transmission system, and a bidirectional data transmitting method for solving the above-mentioned problems.

According to one embodiment of the invention, a bidirectional data transmission system is disclosed. The bidirectional data transmission system includes an input device, a display, a transmission interface, and a host system. The input device comprises a user-input interface or a user manipulating device, and generates an input signal. The display receives and analyzes the input signal and generates an output data signal according to the input signal. The transmission interface is coupled to the display and used for transmitting the output data signal. The host system receives the output data signal via the transmitting interface, and performs operations according to the output data signal. The host system includes a graphic device (such as a graphic interface) and a processor. The graphic device is coupled to the transmission interface and receives the output data signal. The processor is coupled to the graphic device and used for processing the output data signal.

Moreover, another embodiment of the present invention provides a bidirectional data transmitting method including the following steps: receiving and analyzing an input signal, which is generated according to an user's command, to generate an output data signal; transmitting the output data signal to a host system, by which the output data signal is processed, via a transmission interface; transmitting an image data generated by the host system to a display controlling circuit, e.g. an on-screen display controller, via the transmission interface.

The disclosed bidirectional data transmission system and data transmitting method use a transmission interface to transmit data signal in bi-direction for performing bidirectional data transmission function without any USB line. Thereby, the cost of USB lines can be saved and the number of transmission lines can be reduced to improve the disorder degree of the line arrangement.

DETAILED DESCRIPTION OF THE INVENTION

Figure 1:
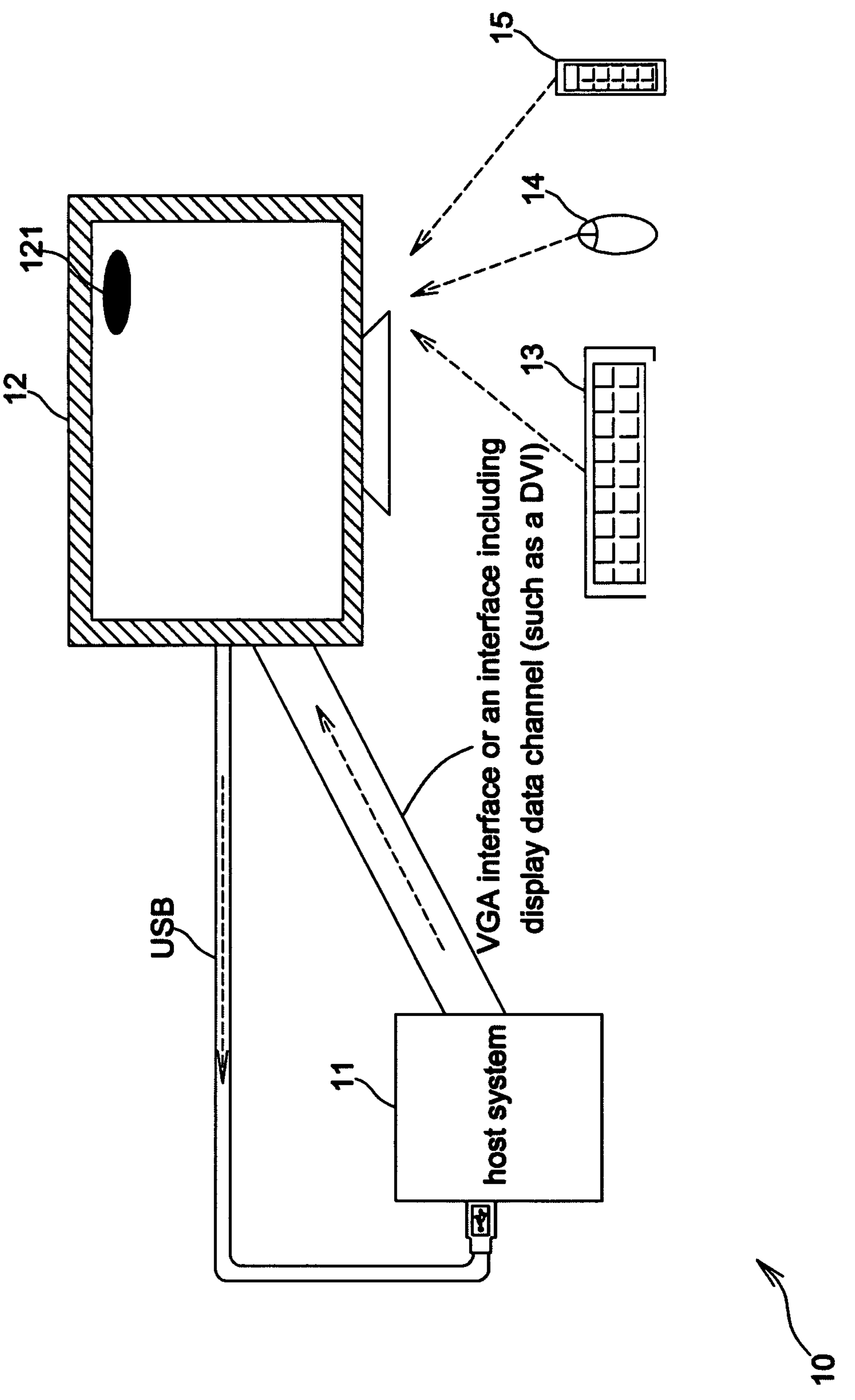
FIG. 1 (Prior Art)
FIG. 1 shows a schematic diagram illustrating a conventional data transmission system.
Figure 2:
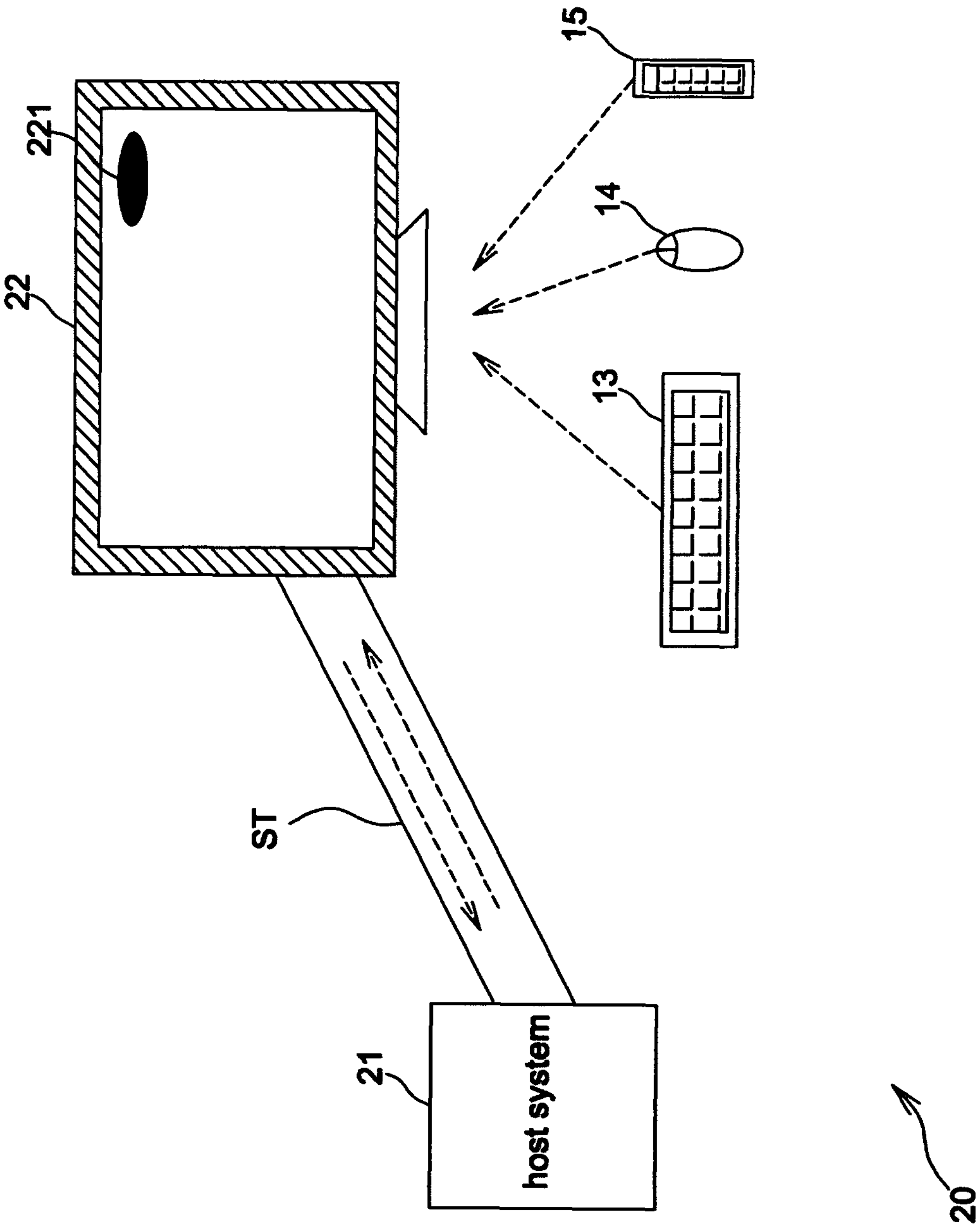
FIG. 2 shows a schematic diagram illustrating a bidirectional data transmission system according to one embodiment of the present invention.

FIG. 2 schematically shows a bidirectional data transmission system 20 according to one embodiment of the present invention. The bidirectional data transmission system 20 includes a host system 21, a display 22, a transmission interface ST which is coupled to the host system 21 and the display 22. Further, the transmission interface ST includes display data channel (DDC) and video graphics array (VGA) interface or digital visual interface (DVI), and three input devices including keyboard 13, mouse 14, and remoter 15.

To be more specific, the above mentioned VGA interface may be a D-Sub interface, a S-Video interface, an AV terminal interface, a 3RCA (YUV, YpbPr or YCbCr) terminal interface, or a BNC terminal interface for example. The host system 21 may be a computer, a cell phone, a personal digital assistant (PDA), a digital camera, a digital video recorder, a set top box, or other devices for receiving data transmitted by the transmission interface ST. The display 22 may be a liquid crystal display (LCD) screen, a cathode ray tube (CRT) screen, an LCD TV, a back-projection TV, a projector, or plasma TV . . . etc. The input devices could be other user-input-interface based devices that are available for user to input control signals, including joystick, voice input device, handwriting tablet, plotting board, and touching panel.

According to one embodiment of the invention, generally, the display data channel (DDC) of the general media interfaces including digital visual interface and high definition multimedia interface (HDMI) is designed to simultaneously have transmission frequency band-width for image data and digital data. According to the $I^2C$ frame, there are three categories of transmission frequency band-width: standard (100K bps), fast speed (400K bps) and high speed (1M bps). However, the DDC is generally used only for transmitting control signals from the graphic device (not shown) such as a graphic card of the host system 21 to an embedded display controller (not shown) of the display 22, or reading related information from the embedded display controller of the display 22, and not used for the remaining time. On the other hand, it has been proved that the transmission frequency band-width for the digital data is sufficient for transmitting data input from one of the ordinary input devices 13, 14 and

15 or the combination thereof. Accordingly, the DDC included inside the transmission interface ST can be used for transmitting digital data or control signals from the display 22 to the host system 21, and at the same time for transmitting image data or control signals from the host system 21 to the display 22, which thereby achieves a bidirectional data transmission. Similarly, a VGA interface can be used as the transmission interface ST in the bidirectional data transmission system 20.

Therefore, it is believed that the bidirectional data transmission system 20 according to one embodiment of the present invention enables a bidirectional data transmission by using the input/output interface 221 of the display 22 to receive the input signal generated by at least one of the input devices 13, 14, and 15 in a wired or wireless manner, and using the VGA interface or the interface including the DDC interface included inside the transmission interface ST to communicate with the host system 21 in bi-direction.

Figure 3:
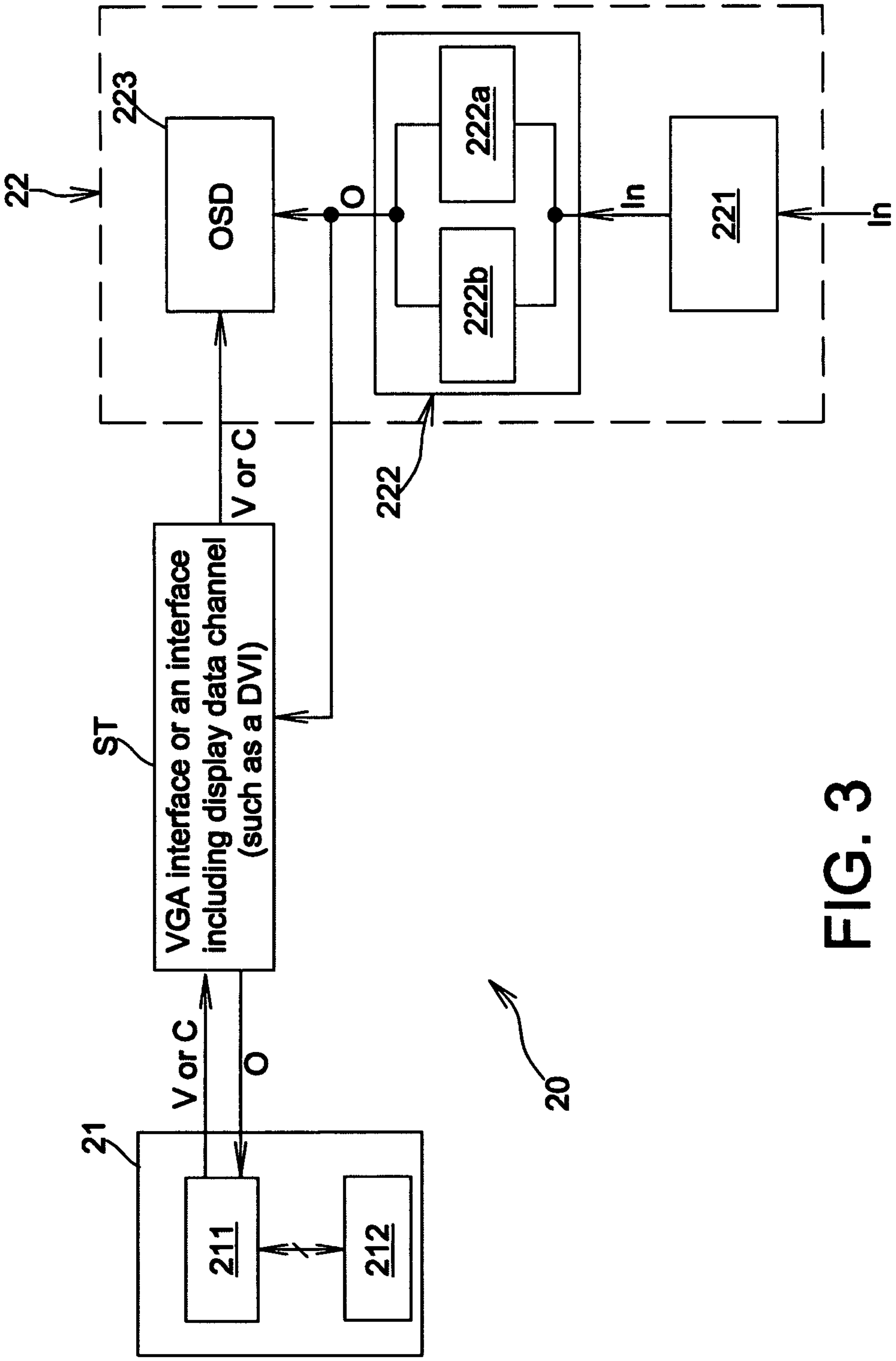
FIG. 3 shows a block diagram illustrating the bidirectional data transmission between a display and a host system via a display data channel according to one embodiment of the present invention.

Referring to FIG. 3, the bidirectional data transmission between the display 22 and the host system 21 is achieved via the display data channel DDC.

The host system 21 includes a graphic device 211 and a processor 212. The graphic device 211 is coupled to the transmission interface ST. The graphic device 211 is a graphic interface for receiving output data signal O via the DDC, such as a graphic card for example. The processor 212 is coupled to the graphic device 211 used to process the output data signal O received by the graphic device 211.

The display 22 receives the input signal In and generates an output data signal O according to the input signal In. The display 22 includes an input/output interface 221, an input data control unit 222, and a display controlling circuit, e.g. an on-screen display controller (OSD) 223.

The input/output interface 221 may be a receiver or other receiving devices having a wired interface such as a USB interface, an RS-232 interface, or a PS2 interface and/or a wireless interface according to the wireless local area network standard protocol such as an infra-red transmission interface or a Bluetooth transmission interface. The input/output interface 221 receives the input signal In generated by one or combination of the input devices 13, 14, and 15 shown in FIG. 2 in a wired or wireless manner, and outputs the signal In. The input signal In may be the key-in information including at least one of character codes, control codes, or both from the keyboard 13, mouse 14, or remoter 15, the (X,Y) coordinate displacement information of the mouse 14, or the combination thereof.

The input data control unit 222 receives and analyzes the input signal In to generate an output data signal O. The input data control unit 222 includes a character registering unit 222*a* and a coordinate registering operation unit 222*b*. When the input signal In is key-in information, the character registering unit 222*a* receives and temporarily stores the key-in information, and then outputs a data signal to the OSD 223 and the DDC. When the input signal In is the (X,Y) coordinate displacement information, the coordinate registering operation unit 222*b* receives and temporarily saves the (X,Y) coordinate displacement, obtains an absolute coordinate value according to the displacement, and outputs a data signal O representing the absolute coordinate value to the OSD 223 and the DDC.

The OSD 223 receives the output data signal O or a control signal C output from the host system 21 to perform parameter setting, or receives image data V output from the host system 21 to display images.

A display 22 may be set to be in TV mode or in PC mode. When the display 22 is in TV mode, the OSD 223 receives and performs processes according to the output data signal O and thereby makes the cursor corresponding to the keyboard 13, the mouse 14, or the remoter 15 move on the screen so as to accomplish a click input from the mouse 14, or a character input from the keyboard 13, or a control signal input from the remoter 15 to accomplish a selection of the TV menu, thereby to perform channel switching, volume tuning, TV/PC mode switching, recording, and video recording etc.

When the display 22 is in the PC mode, the host system 21 receives the output data signal O via the DDC, and performs operations such as executing an instruction corresponding to the output data signal O according to the output data signal O. At the same time, the host system 21 transmits the processed image data V to the OSD 223 of the display 22 via the VGA interface or the DVI to display the image. In addition, in the PC mode, the setting of the OSD image parameters including contrast, brightness, and white balance can be adjusted by the output data signal O derived from the keyboard 13, the mouse 14 and/or the remoter 15, or by control signal C derived from the host system 21 transmitted via the DDC. According to this, the bidirectional data transmission system 20 according to the present invention transmits control signals C or image data V and output data signal O via the DDC in a bidirectional manner. Thereby, the object of bidirectional data transmission can be achieved without using the USB module and transmission line, and the cost of the USB module and the USB transmission line can therefore be saved. Also, the object of reducing the amount of transmission line and the disordered degree of line arrangement can be achieved.

In another embodiment, the bidirectional data transmission system 20 is accomplished by replacing the DDC with a VGA interface such as the D-Sub interface, and using the VGA interface to transmit control signals C or image data V and output data signals O between the host system 21 and the display 22 to achieve bidirectional data transmission.

It is to be noted that an ordinary graphic device 211 of the host system 21 is not designed to function with the VGA interface or the DDC interface to receive the output data signal O from the display 22. Therefore, the driver of the graphic device 221 of the host system 21 is redesigned to perform the function of receiving the output data signal O from the display 22 via the VGA interface or the DDC interface. However, the design of the driver belongs to the known art and will not be described here.

Figure 4:
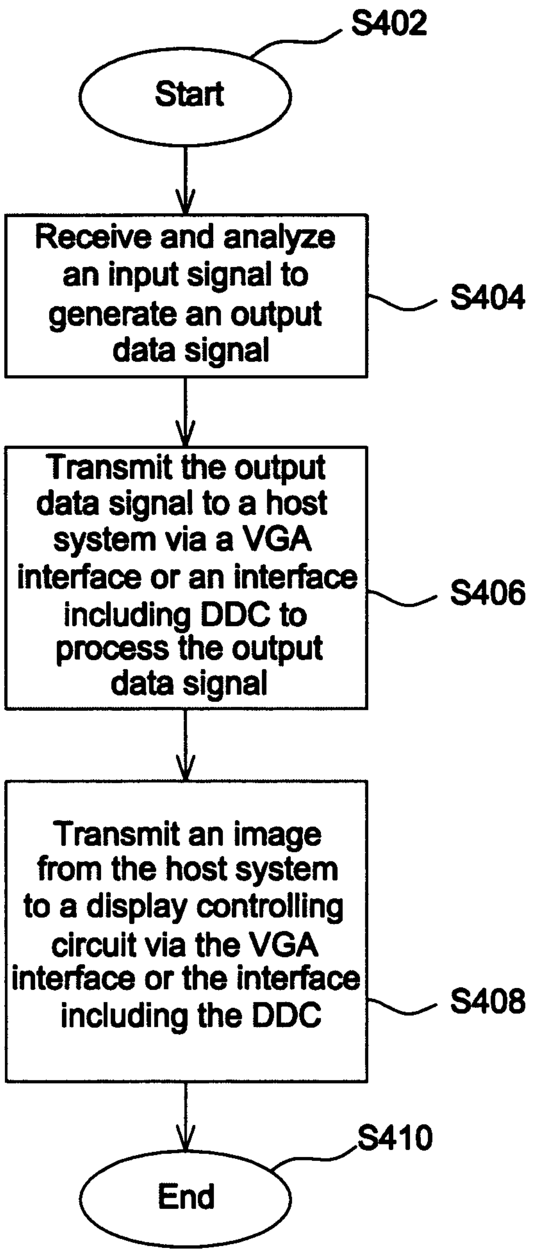
FIG. 4 shows a flow chart illustrating a bidirectional data transmission method according to another embodiment of the present invention.

Referring to FIG. 4, a bidirectional data transmission method according to one embodiment of the present invention includes the following steps.

Step S402: Start.

Step S404: Receive and analyze an input signal, which is generated according to a user's command, to generate an output data signal.

Step S406: Transmit the output data signal to a host system via a VGA interface or an interface including DDC to process the output data signal.

Step S408: Transmit an image from the host system to a display controlling circuit, e.g. an on-screen display controller, via the VGA interface or the interface including the DDC.

Step S410: End.

Figure 5:
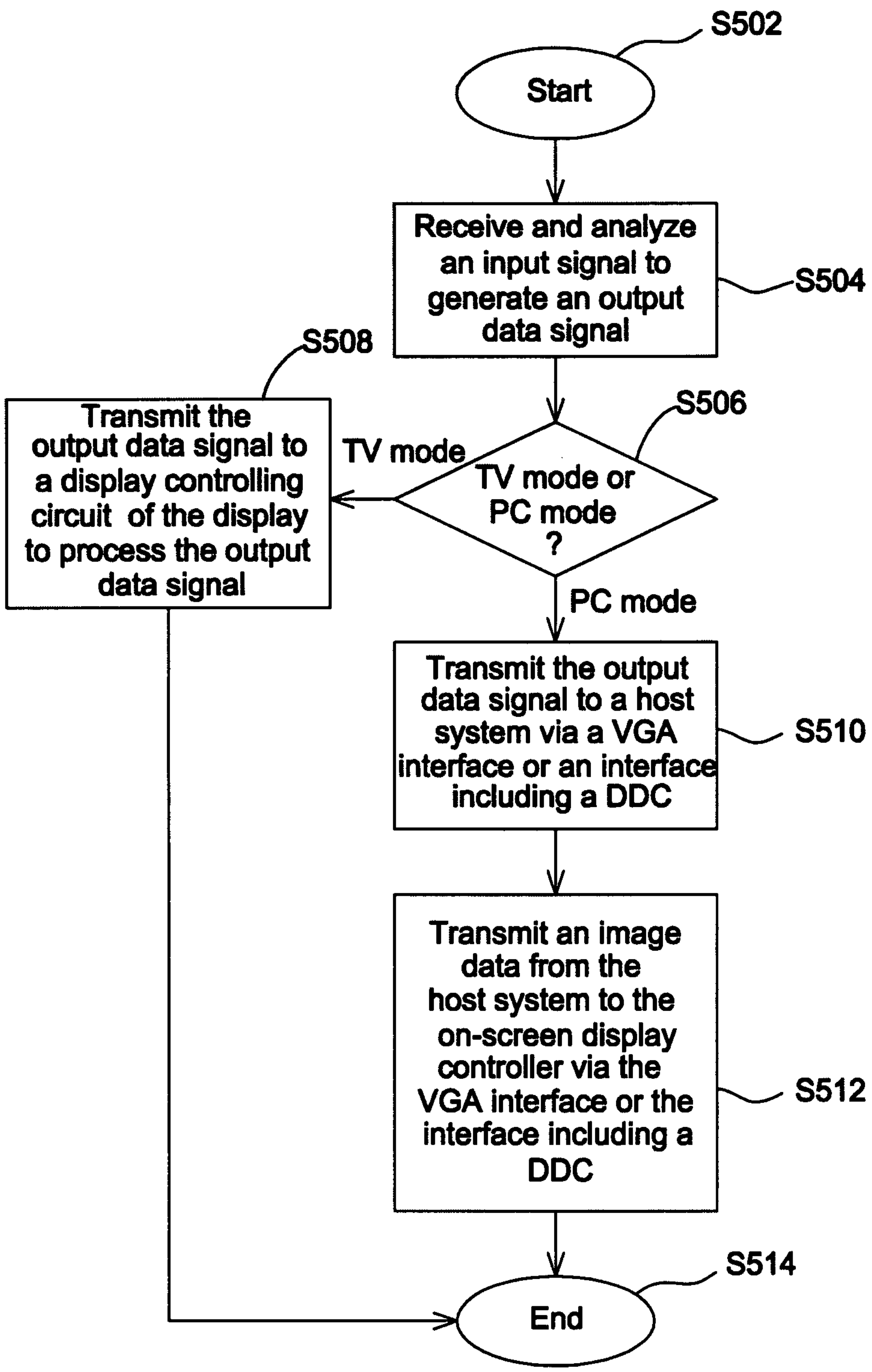
FIG. 5 shows a flow chart illustrating another bidirectional data transmission method according to another embodiment of the present invention.

Referring to FIG. 5, another bidirectional data transmission method according to another embodiment of the present invention includes the following steps.

Step S502: Start.

Step S504: Receive and analyze an input signal to generate an output data signal.

Step S506: Determine whether a display is set in TV mode or PC mode; if in TV mode, execute step S508; if in PC mode, execute step S510.

Step S508: Transmit the output data signal to a display controlling circuit of the display, e.g. an on-screen display controller, to process the output data signal. Then execute step S514.

Step S510: Transmit the output data signal to a host system via a VGA interface or an interface including a DDC.

Step S512: Transmit an image data from the host system to the display controlling circuit via the VGA interface or the interface including a DDC.

Step S514: End.

Figure 6:
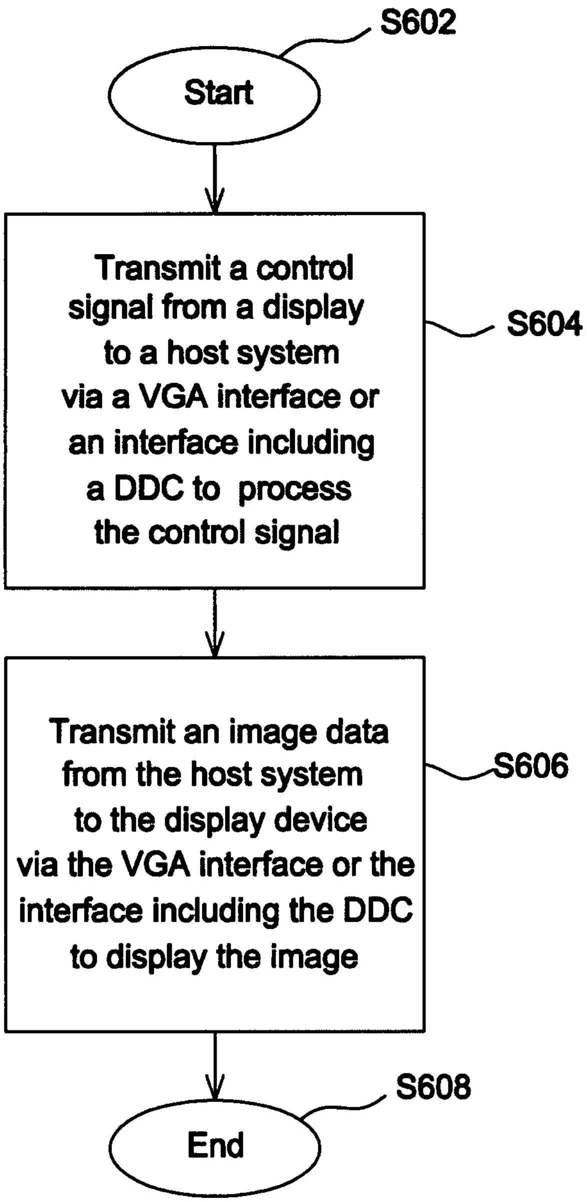
FIG. 6 shows a flow chart illustrating another bidirectional data transmission method according to another embodiment of the present invention.

Referring to FIG. 6, still another bidirectional data transmission method according to another embodiment of the present invention includes the following steps.

Step S602: Start.

Step S604: Transmit a control signal from a display to a host system via a VGA interface or an interface including a DDC to process the control signal.

Step S606: Transmit an image data from the host system to the display via the VGA interface or the interface including the DDC to display the image.

Step S608: End.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A bidirectional data transmission system, comprising:
- an input device, comprising a user-input interface, for generating an input signal;
- a display for receiving the input signal and generating an output data signal according to the input signal;
- a transmission interface, coupled to the display, for transmitting the output data signal; and
- a host system comprising:
  - a graphic device, coupled to the transmission interface, for receiving the output data signal and interpreting the output data with a digital visual interface driver or a high definition multimedia interface driver; and
  - a processor, coupled to the graphic device, for processing the output data signal;
- wherein the display is set in a TV mode or in a PC mode to output the output data signal to a display controlling circuit of the display by which the output data signal is processed to perform channel switching, volume tuning, TV/PC mode switching, recording, or video recording in the TV mode, and to transmit the output data signal to the host system via the transmission interface and receive a control signal outputted from the host system by the display controlling circuit via the transmission interface in the PC mode to perform parameter setting of the display, and wherein the control signal outputted from the host system in the PC mode to perform parameter setting of the display is generated based on the output data signal received by the host system in the PC mode.

2. The bidirectional data transmission system of claim 1, wherein the display comprises:
- an input data control unit receiving and analyzing the input signal to generate the output data signal; and
- a display controlling circuit receiving the output data signal or a control signal output from the host system to perform parameter setting, or receiving image data output from the host system to display images.

3. The bidirectional data transmission system of claim 2, wherein the display further comprises an input/output interface receiving the input signal in a wireless manner.

4. The bidirectional data transmission system of claim 1, wherein the input signal is key-in information from keyboard or mouse or remoter, the coordinate displacement information of mouse, or the combination thereof.

5. The bidirectional data transmission system of claim 1, wherein the input device is one of keyboard, mouse, remoter, joystick, handwriting tablet, plotting board, touching panel, and voice input device.

6. The bidirectional data transmission system of claim 1, wherein the display is selected from the group consisting of liquid crystal display screen, cathode ray tube screen, LCD TV, back-projection TV, projector, and plasma TV.

7. The bidirectional data transmission system of claim 1, wherein the host system is selected from the group consisting of computer, cell phone, personal digital assistant, digital camera, digital video recorder, and set top box.

8. A display controller installed in a display for receiving an input signal, which is generated by an user-input device, and using a digital visual interface or a high definition multimedia interface to perform bidirectional data transmission with a graphic card of a host system, the display controller comprising:
- an input data control unit for receiving and analyzing the input signal to generate an output data signal; and
- a display controlling circuit for receiving an image data to display image;
- wherein the graphic card receives the output data signal via the digital visual interface or the high definition multimedia interface and transmits it to the host system, the host system processes the output data signal, and the graphic card transmits the image data from the host system to the display controlling circuit via the digital visual interface or the high definition multimedia interface;
- wherein the display is set in a TV mode or in a PC mode to output the output data signal to a display controlling circuit of the display by which the output data signal is processed to perform channel switching, volume tuning, TV/PC mode switching, recording, or video recording in the TV mode, and to transmit the output data signal to the host system via the transmission interface and receive a control signal outputted from the host system by the display controlling circuit via the transmission interface in the PC mode to perform parameter setting of the display, and wherein the control signal outputted from the host system in the PC mode to perform parameter setting of the display is generated based on the output data signal received by the host system in the PC mode.

9. The display controller of claim 8, further comprising an input/output interface for receiving the input signal in a wireless manner and outputting the input signal to the input data control unit.

10. The display controller of claim 8, wherein the input signal is key-in information from keyboard or mouse or remoter, the coordinate displacement information of mouse, or the combination thereof.

11. The display controller of claim 8, wherein the user-input device is one of keyboard, mouse, remoter, joystick, handwriting tablet, plotting board, touching panel, and voice input device.

12. The display controller of claim 8, wherein the display controller is installed in one of LCD monitor, cathode ray tube screen, LCD TV, back-projection TV, projector, and plasma TV.

13. The display controller of claim 8, wherein the host system is selected from the group consisting of computer, cell phone, personal digital assistant, digital camera, digital video recorder, and set top box.

14. A bidirectional data transmitting method comprising:

receiving and analyzing an input signal to generate an output data signal;

determining whether a display is set in a TV mode or in a PC mode;

if the display is set in the TV mode, outputting the output data signal to a display controlling circuit of the display, by which the output data signal is processed, to perform channel switching, volume tuning, TV/PC mode switching, recording, or video recording; and if the display is set in the PC mode, transmitting the output data signal to a host system via a transmission interface, and transmitting a control signal outputted from the host system to the display controlling circuit via the transmission interface to perform parameter setting of the display, and wherein the control signal outputted from the host system in the PC mode to perform parameter setting of the display is generated based on the output data signal received by the host system in the PC mode.

15. The bidirectional data transmitting method of claim 14, wherein the input signal is key-in information from keyboard or mouse or remoter, the coordinate displacement information of mouse, or the combination thereof.

16. The bidirectional data transmitting method of claim 15, wherein the transmission interface is selected from the group consisting of video graphics array interface and an interface comprising a display data channel.

17. The bidirectional data transmitting method of claim 14, further comprising:

transmitting a control signal from the display to the host system via a video graphics array interface or a digital visual interface or a high definition multimedia interface, so as to process the control signal; and transmitting an image data generated by the host system to the display via the video graphics array interface or the digital visual interface or the high definition multimedia interface, so as to display the image.

18. The bidirectional data transmitting method of claim 17, wherein the control signal is key-in information from keyboard or mouse or remoter, the coordinate displacement information of mouse, or the combination thereof.

19. The bidirectional data transmitting method of claim 18, wherein the key-in information is selected from the group consisting character code and control code.

20. A display, comprising:

an input interface for receiving an input signal generated by a user manipulating device;

a processing unit for generating an output signal according to the input signal; and a transmission interface for transmitting the output signal to a host system, and transmitting data from the host system to the display, wherein the transmission interface is a video graphics array interface, a digital visual interface, or a high definition multimedia interface;

wherein the display is set in a TV mode or in a PC mode to output the output data signal to a display controlling circuit of the display by which the output data signal is processed to perform channel switching, volume tuning, TV/PC mode switching, recording, or video recording in the TV mode, and to transmit the output data signal to the host system via the transmission interface and receive a control signal outputted from the host system by the display controlling circuit via the transmission interface in the PC mode to perform parameter setting of the display, and wherein the control signal outputted from the host system in the PC mode to perform parameter setting of the display is generated based on the output data signal received by the host system in the PC mode.

21. The display of claim 20, wherein the input interface comprises a wireless interface.

22. The display of claim 21, wherein the wireless interface is an infra-red interface.

23. The display of claim 21, wherein the wireless interface is complying with the wireless local area network standard protocol.

24. The display of claim 21, wherein the wireless interface is a Bluetooth interface.

25. The display of claim 20, wherein the input interface comprises a wired interface.

26. The display of claim 25, wherein the wired interface is one of a USB interface, RS-232 interface, and PS2 interface.

27. The display of claim 20, wherein the user manipulating device is selected from the group consisting of keyboard, mouse, remoter, joystick, handwriting tablet, plotting board, touching panel, and voice input device.

28. The display of claim 20, wherein the host system comprises:

a graphic interface for receiving the output signal; and a processor for processing the output signal.

29. The display of claim 20, wherein the host system is selected from the group consisting of computer, cell phone, personal digital assistant, digital camera, digital video recorder, and set top box.

30. The display of claim 20, wherein the display is selected from the group consisting of liquid crystal display device, cathode ray tube screen, and plasma TV.

31. The display of claim 20, wherein the processing unit comprises one selected of the group consisting of a coordinate registering operation unit and a character registering unit.

* * * * *